United States Patent
Yeom et al.

(10) Patent No.: US 12,246,752 B2
(45) Date of Patent: Mar. 11, 2025

(54) CONTROL METHOD FOR MONITORING AND RESPONDING TO HACKING INTO VEHICLE

(71) Applicants: HYUNDAI MOTOR COMPANY, Seoul (KR); KIA CORPORATION, Seoul (KR)

(72) Inventors: Myung Ki Yeom, Incheon (KR); In Su Kim, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 221 days.

(21) Appl. No.: 18/084,071

(22) Filed: Dec. 19, 2022

(65) Prior Publication Data
US 2024/0059324 A1 Feb. 22, 2024

(30) Foreign Application Priority Data
Aug. 16, 2022 (KR) .................. 10-2022-0101766

(51) Int. Cl.
*B60W 50/14* (2020.01)
*B60W 30/02* (2012.01)
*B60W 60/00* (2020.01)

(52) U.S. Cl.
CPC ...... *B60W 60/00188* (2020.02); *B60W 30/02* (2013.01); *B60W 50/14* (2013.01); *B60W 2050/146* (2013.01); *B60W 2510/182* (2013.01)

(58) Field of Classification Search
CPC .......... B60W 60/00188; B60W 30/02; B60W 50/14; B60W 2050/146; B60W 2510/182; B60W 50/02; G06F 21/552; G06F 11/08; G06F 21/55; G05B 23/027; H04L 63/14
See application file for complete search history.

(56) References Cited

U.S. PATENT DOCUMENTS

| | | | |
|---|---|---|---|
| 2012/0093312 A1* | 4/2012 | Gammel | H04L 9/12 380/255 |
| 2022/0107637 A1* | 4/2022 | Chan | G01S 19/21 |
| 2022/0402525 A1* | 12/2022 | Maeda | B60W 60/00188 |
| 2023/0376243 A1* | 11/2023 | Basu | G06F 3/0659 |
| 2024/0253607 A1* | 8/2024 | Yoshida | B60T 8/28 |
| 2024/0282196 A1* | 8/2024 | Nagatsuka | G06V 20/58 |

* cited by examiner

*Primary Examiner* — Ashley L Redhead, Jr.
(74) *Attorney, Agent, or Firm* — Morgan, Lewis & Bockius LLP

(57) ABSTRACT

A control method for monitoring and responding to hacking into a vehicle, which may monitor whether hacking is performed by cross-checking preset check values for each ID with each other in a state where a plurality of controllers mounted in an autonomous vehicle is connected like a blockchain, and response-control the vehicle in a safe state upon determining that a specific controller is hacked as a result of monitoring.

19 Claims, 8 Drawing Sheets

| ID 0×123 | byte 1 | byte 2 | byte 3 | byte 4 | byte 5 | byte 6 | byte 7 | byte 8 |
|---|---|---|---|---|---|---|---|---|
| DATA CONTENT | | WHEEL SPEED FL | WHEEL SPEED FR | WHEEL SPEED RL | WHEEL SPEED RR | HYDRAULIC PRESSURE #1 | HYDRAULIC PRESSURE #2 | HYDRAULIC PRESSURE #2 | CHECK VALUE k1 |
| DATA VALUE | | 55 | 56 | 55 | 56 | 0 | 20 | 10 | 0 |
| CHECK VALUE | 55+56+55+56+0+20+10+0 = 252 |

DURING FIRST CALCULATION

| ID 0×123 | byte 1 | byte 2 | byte 3 | byte 4 | byte 5 | byte 6 | byte 7 | byte 8 |
|---|---|---|---|---|---|---|---|---|
| DATA CONTENT | WHEEL SPEED FL | WHEEL SPEED FR | WHEEL SPEED RL | WHEEL SPEED RR | HYDRAULIC PRESSURE #1 | HYDRAULIC PRESSURE #2 | HYDRAULIC PRESSURE #2 | CHECK VALUE k1 |
| DATA VALUE | 56 | 58 | 58 | 60 | 0 | 20 | 10 | 252 |
| CHECK VALUE | [56+58+58+60+0+20+10+(252)]mod256 = 2 |

DURING SECOND CALCULATION

| ID 0×123 | byte 1 | byte 2 | byte 3 | byte 4 | byte 5 | byte 6 | byte 7 | byte 8 |
|---|---|---|---|---|---|---|---|---|
| DATA CONTENT | WHEEL SPEED FL | WHEEL SPEED FR | WHEEL SPEED RL | WHEEL SPEED RR | HYDRAULIC PRESSURE #1 | HYDRAULIC PRESSURE #2 | HYDRAULIC PRESSURE #2 | CHECK VALUE k1 |
| DATA VALUE | 57 | 59 | 59 | 61 | 0 | 20 | 10 | 2 |
| CHECK VALUE | [57+59+59+61+0+20+10+(2)]mod256 = 12 |

DURING THIRD CALCULATION

| ID 0×123 | byte 1 | byte 2 | byte 3 | byte 4 | byte 5 | byte 6 | byte 7 | byte 8 |
|---|---|---|---|---|---|---|---|---|
| DATA CONTENT | WHEEL SPEED FL | WHEEL SPEED FR | WHEEL SPEED RL | WHEEL SPEED RR | HYDRAULIC PRESSURE #1 | HYDRAULIC PRESSURE #2 | HYDRAULIC PRESSURE #2 | CHECK VALUE k1 |
| DATA VALUE | 58 | 60 | 60 | 62 | 0 | 20 | 10 | 12 |
| CHECK VALUE | [58+60+60+62+0+20+10+(12)]mod256 = 26 |

DURING FOURTH CALCULATION

FIG.5

FIG.6

FIG. 7

| CHECK VALUES FOR EACH ID TRANSMITTED FROM FIRST CONTROLLER TO SECOND TO SIXTH CONTROLLERS | CHECK VALUES FOR EACH ID RECEIVED BY FIRST CONTROLLER FROM SECOND TO SIXTH CONTROLLERS | DETERMINATION |
|---|---|---|
| ID 0×001 : 50 | ID 0×001 : 50 | OK |
| ID 0×002 : 63 | ID 0×002 : 63 | OK |
| ID 0×003 : 115 | ID 0×003 : 115 | OK |
| ID 0×004 : 15 | ID 0×004 : 15 | OK |
| ID 0×005 : 21 | ID 0×005 : 21 | OK |
| ID 0×006 : 150 | ID 0×006 : 150 | OK |

| CHECK VALUES FOR EACH ID TRANSMITTED FROM FIRST CONTROLLER TO SECOND TO SIXTH CONTROLLERS | CHECK VALUES FOR EACH ID RECEIVED BY FIRST CONTROLLER FROM SECOND, THIRD, FIFTH, AND SIXTH CONTROLLERS | CHECK VALUES FOR EACH ID RECEIVED BY FIRST CONTROLLER FROM FOURTH CONTROLLER | DETERMINATION |
|---|---|---|---|
| ID 0×001 : 50 | ID 0×001 : 50 | ID 0×001 : NOT RECEIVED | FOURTH CONTROLLER ERROR |
| ID 0×002 : 63 | ID 0×002 : 63 | ID 0×002 : NOT RECEIVED | FOURTH CONTROLLER ERROR |
| ID 0×003 : 115 | ID 0×003 : 115 | ID 0×003 : NOT RECEIVED | FOURTH CONTROLLER ERROR |
| ID 0×004 : 15 | ID 0×004 : 15 | ID 0×004 : 7 | FOURTH CONTROLLER ERROR |
| ID 0×005 : 21 | ID 0×005 : 21 | ID 0×005 : NOT RECEIVED | FOURTH CONTROLLER ERROR |
| ID 0×006 : 150 | ID 0×006 : 150 | ID 0×006 : NOT RECEIVED | FOURTH CONTROLLER ERROR |

FIG.8

CONTROL METHOD FOR MONITORING AND RESPONDING TO HACKING INTO VEHICLE

CROSS-REFERENCE TO RELATED APPLICATION

This application claims, under 35 U.S.C. § 119(a), the benefit of and priority to Korean Patent Application No. 10-2022-0101766 filed on Aug. 16, 2022, the entire contents of which are incorporated herein by reference.

BACKGROUND

(a) Technical Field

The present disclosure relates to a control method for monitoring and responding to hacking into a vehicle. More particularly, it relates to a control method for monitoring and responding to hacking into a vehicle in which controllers of an autonomous vehicle monitor each other for hacking, and when hacking is determined, the vehicle may be controlled in a safe state.

(b) Description of Related Art

While driving an autonomous vehicle, it is possible to use V2V (Vehicle-to-Vehicle) communication for exchanging driving-related information between vehicles, V2I (Vehicle-to-Infrastructure) communication with an RSU (Road-Side Unit) for information infrastructure installed around roads, V2N (Vehicle-to-Network) communication for connection with an external network, V2C (Vehicle-to-Cloud) communication for connection with external cloud infrastructure, etc.

When such an autonomous vehicle is driven using the above communication, the vehicle may be hacked from the outside or may be affected by erroneous external information, which may cause a problem in driving safety of the autonomous vehicle.

For example, the autonomous vehicle is equipped with a plurality of controllers using communication. When the controllers are hacked, a vehicle negligent accident may occur.

Accordingly, there is a demand for a method for preventing and responding to hacking of various controllers of the autonomous vehicle.

SUMMARY

The present disclosure has been made in an effort to solve the above-described problems associated with prior art. An object of the present disclosure is to provide a control method for monitoring and responding to hacking into a vehicle, which may monitor whether hacking is performed by cross-checking preset check values for each ID with each other in a state where a plurality of controllers mounted in an autonomous vehicle is connected like a blockchain, and response-control the vehicle in a safe state upon determining that a specific controller is hacked as a result of monitoring.

In one aspect, the present disclosure provides a control method for monitoring and responding to hacking into a vehicle. The control method also includes calculating, by each of a plurality of controllers, a check value to determine whether hacking is performed, where the plurality of controllers are mounted in the vehicle and connected so that data is allowed to be transmitted and received. The method also includes mutually transmitting and receiving, by each of the plurality of the controllers, a calculated check value. The method also includes comparing, by each of the plurality of the controllers, a transmitted check value with a received check value to determine whether any one or more controllers among the plurality of the controllers is in an error state due to hacking according to whether the transmitted check value and the received check value are the same.

In a preferred embodiment, in response to each of the plurality of the controllers calculating the check value, the control method further may include, calculating, by each of the plurality of the controllers, a check value for each ID by assigning a designated ID to each of the plurality of the controllers.

In another preferred embodiment, the check value may be calculated, by each of the plurality of the controllers, using a preset calculation method using a randomly determined data value related to control and a previously calculated check value at regular intervals.

In still another preferred embodiment, the check value may be calculated, by each of the plurality of the controllers, by adding the randomly determined data value related to the control to the previously calculated check value at the regular intervals.

In yet another preferred embodiment, the check value may be calculated, by each of the plurality of the controllers, by adding the randomly determined data value related to the control to the previously calculated check value at the regular intervals and then performing, by each of the plurality of the controllers, mod function processing.

In still yet another preferred embodiment, there is a first check value calculated n minutes before, and the check value may be calculated by further adding the first check value to a value obtained by adding the randomly determined data value related to the control to the previously calculated check value at the regular intervals and then performing, by each of the plurality of the controllers, mod function processing on the added value.

In a further preferred embodiment, the transmitted check value is a check value transmitted to other controllers, the received check value is a check value received from each of the other controllers, the transmitted check value is compared with the received check value, and the transmitted and received check values are the same, the control method may include determining, by each of the plurality of the controllers, that all the other controllers are in a normal state without error.

In another further preferred embodiment, the transmitted check value is a check value transmitted to other controllers, the received check value is a check value received from each of the other controllers, the transmitted check value is compared with the received check value, and the transmitted check value is not the same as the received check value received from any one of the other controllers, the control method includes determining, by each of the plurality of the controllers, that the one of the other controllers is a controller in an error state due to hacking.

In still another further preferred embodiment, in response to a check value not being received from any one of the other controllers, the control method may include determining, each of the plurality of the controllers, that the one of the other controllers from which the check value is not received is a controller in an error state due to hacking.

In yet another further preferred embodiment, the control method may include performing, by at least one of the plurality of the controllers, an alarm step including warning that a controller determined to be in an error state is present through a display of a cluster in response to any one of the plurality of the controllers being determined to be a controller in an error state due to hacking.

In still yet another further preferred embodiment, the control method may include performing, by at least one of the plurality of the controllers, a response control step of vehicle stabilization for a controller determined to be in an error state in response to any one of the plurality of the controllers being determined to be the controller determined to be in the error state due to hacking.

In a still further preferred embodiment, the response control step of vehicle stabilization may include a step of performing, by the at least one of the plurality of the controllers, a control operation of minimizing an operation of the controller in the error state due to hacking and performing, by the at least one of the plurality of the controllers, a function of the controller in the error state in place of the controller by another controller not in an error state due to hacking.

In a yet still further preferred embodiment, the response control step of vehicle stabilization may include, upon determining, by the at least one of the plurality of the controllers, that an autonomous driving controller among the plurality of the controllers may be the controller in the error state due to hacking, the autonomous driving controller may not output a control signal for autonomous driving, and performing, by another controller, a control operation to switch a driving mode to a manual driving mode.

In a yet still further preferred embodiment, the response control step of vehicle stabilization may include, upon determining, by the at least one of the plurality of the controllers, that an electronic parking brake (EPB) controller among the plurality of the controllers may be the controller in the error state due to hacking, verifying, by an autonomous driving controller, whether an EPB may be forcibly operated during driving, and then upon confirming that the EPB may be forcibly operated, performing, by the at least one of the plurality of the controllers, a control operation including increasing braking hydraulic pressure in a wheel corresponding to uneven braking to prevent uneven braking.

In a yet still further preferred embodiment, the response control step of vehicle stabilization may include, in response to an EPB controller among the plurality of the controllers being determined to be the controller in the error state due to hacking, and an EPB is not operated after the vehicle is stopped, performing, by an autonomous driving controller, a control operation to increase braking hydraulic pressure of each wheel to a level allowing braking to stop.

In a yet still further preferred embodiment, in response to any one of the plurality of the controllers being determined to be a controller in an error state, and the controller determined to be in the error state may output a general failure signal, not a hacking signal, the control method further may include determining, by at least one of the plurality of the controllers, that the controller determined to be in the error state may be in a general failure state, not a hacked state.

In a yet still further preferred embodiment, the control method may include determining, by at least one of the plurality of the controllers, whether a separate controller may be additionally installed in the vehicle before the check value may be calculated.

In a yet still further preferred embodiment, the control method may include verifying, by at least one of the plurality of the controllers, whether the additionally installed separate controller may be added by intention of a driver upon determining that the separate controller is determined to be additionally installed.

In a yet still further preferred embodiment, upon confirming that the separate controller is additionally installed by intention of the driver, the control method further may include calculating, by the separate controller and the plurality of the controllers installed in the vehicle, a check value to determine whether hacking is performed.

In a yet still further preferred embodiment, in response to the separate controller not being additionally installed by intention of the driver, the control method may include outputting, by a cluster controller among the plurality of the controllers, an alarm signal to obtain maintenance to the driver.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 5 is a table illustrating an example of calculating a check value for each ID in each controller according to an embodiment of the present disclosure;

FIG. 6 is a table illustrating an example of calculating a check value for each ID in each controller according to another embodiment of the present disclosure; and FIGS. 7 and 8 are diagrams illustrating a method of verifying whether each controller has an error according to a check value for each ID calculated in each controller in the control method for monitoring and responding to hacking into the vehicle according to the present disclosure.

DETAILED DESCRIPTION

Hereinafter, preferred embodiments of the present disclosure will be described in detail with reference to the accompanying drawings.

Figure 1:
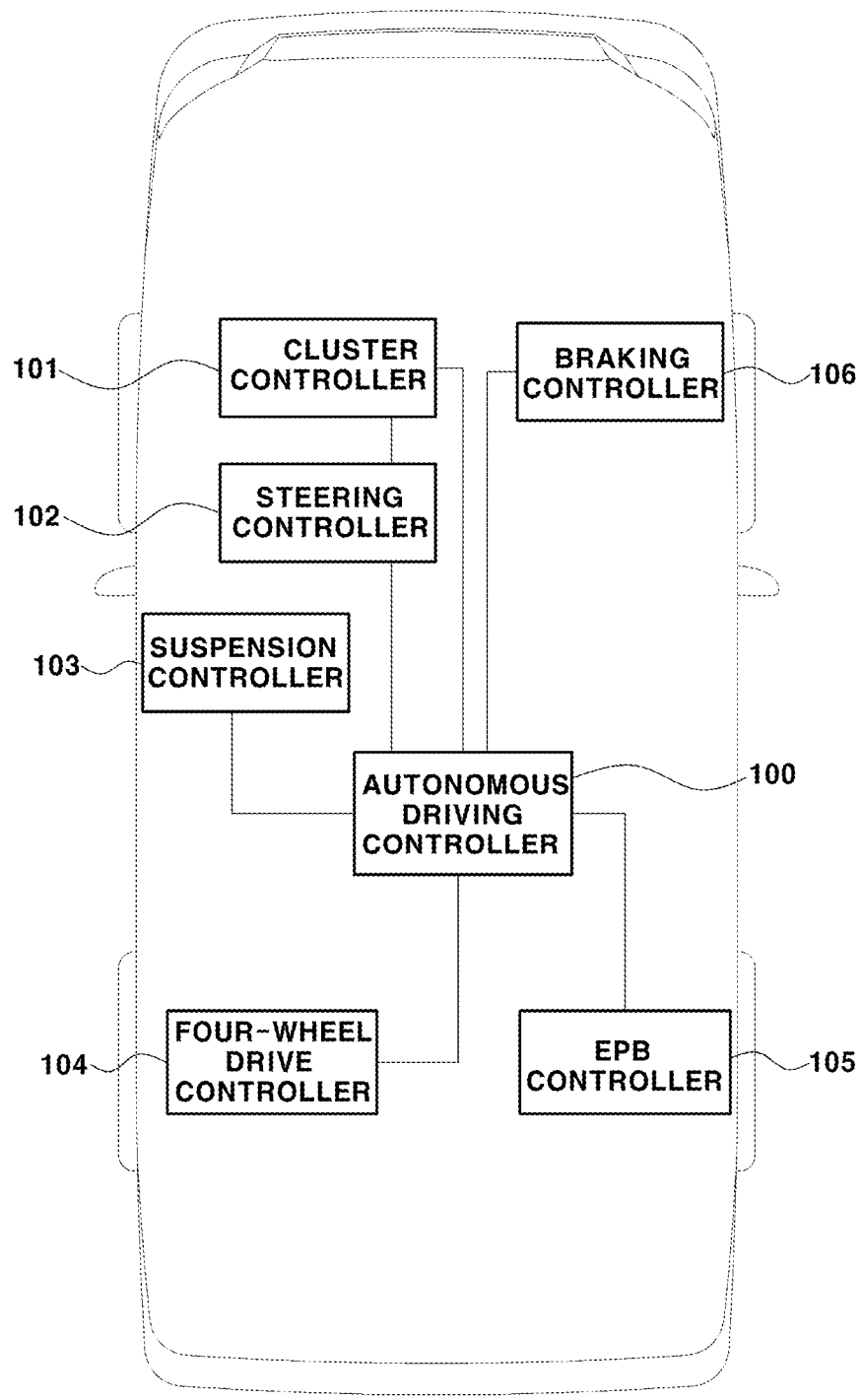
FIG. 1 is a schematic diagram illustrating an example of controllers mounted in an autonomous vehicle.

FIG. 1 is a schematic diagram illustrating various controllers mounted in an autonomous vehicle.

As illustrated in FIG. 1, a plurality of controllers commonly referred to as electronic control units (ECUs) is mounted in the autonomous vehicle, and the controllers include an autonomous driving controller 100 which is an upper controller, and a cluster controller 101, a steering controller 102, a suspension controller 103, a four-wheel drive controller 104, an EPB controller 105, a braking controller 106 for controlling an electronic braking system, etc., which are lower controllers.

Figure 2:
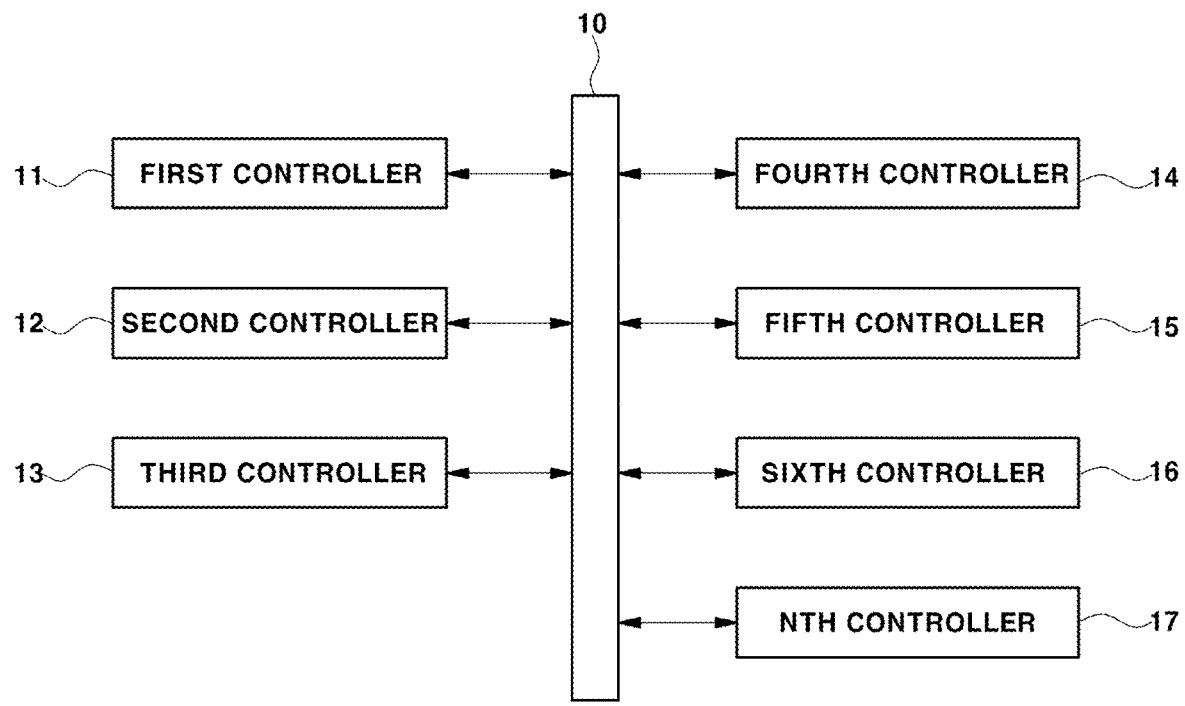
FIG. 2 is a schematic diagram illustrating a state in which a plurality of controllers mounted in an autonomous vehicle is connected by a controller area network (CAN) communication line.

FIG. 2 is a schematic diagram illustrating a state in which the plurality of controllers mounted in the autonomous vehicle is connected by a CAN communication line.

The plurality of controllers mounted in the autonomous vehicle is connected by a CAN communication line 10 so that data can be mutually transmitted and received therebetween.

For example, a plurality of controllers including a first controller 11 corresponding to an autonomous driving controller, a second controller 12 corresponding to a cluster controller, a third controller 13 corresponding to a steering controller, a fourth controller corresponding to a suspension controller 14, a fifth controller 15 corresponding to a four-wheel drive controller, a sixth controller 16 corresponding to an EPB controller, an nth controller 17 corresponding to a braking controller, etc. may be connected like a blockchain as illustrated in FIG. 2 so that data can be transmitted and received by the CAN communication line 10.

Accordingly, all the controllers mounted in the autonomous vehicle, that is, the first controller 11 to the nth controller 17, are interconnected by the CAN communication line 10 like a blockchain method, so that any data values may be mutually transmitted and received therebetween, and/or whether an abnormal operation occurs due to hacking therebetween may be monitored.

Here, a control method for monitoring and responding to hacking into a vehicle according to the present disclosure will be sequentially described in detail.

Figure 3:
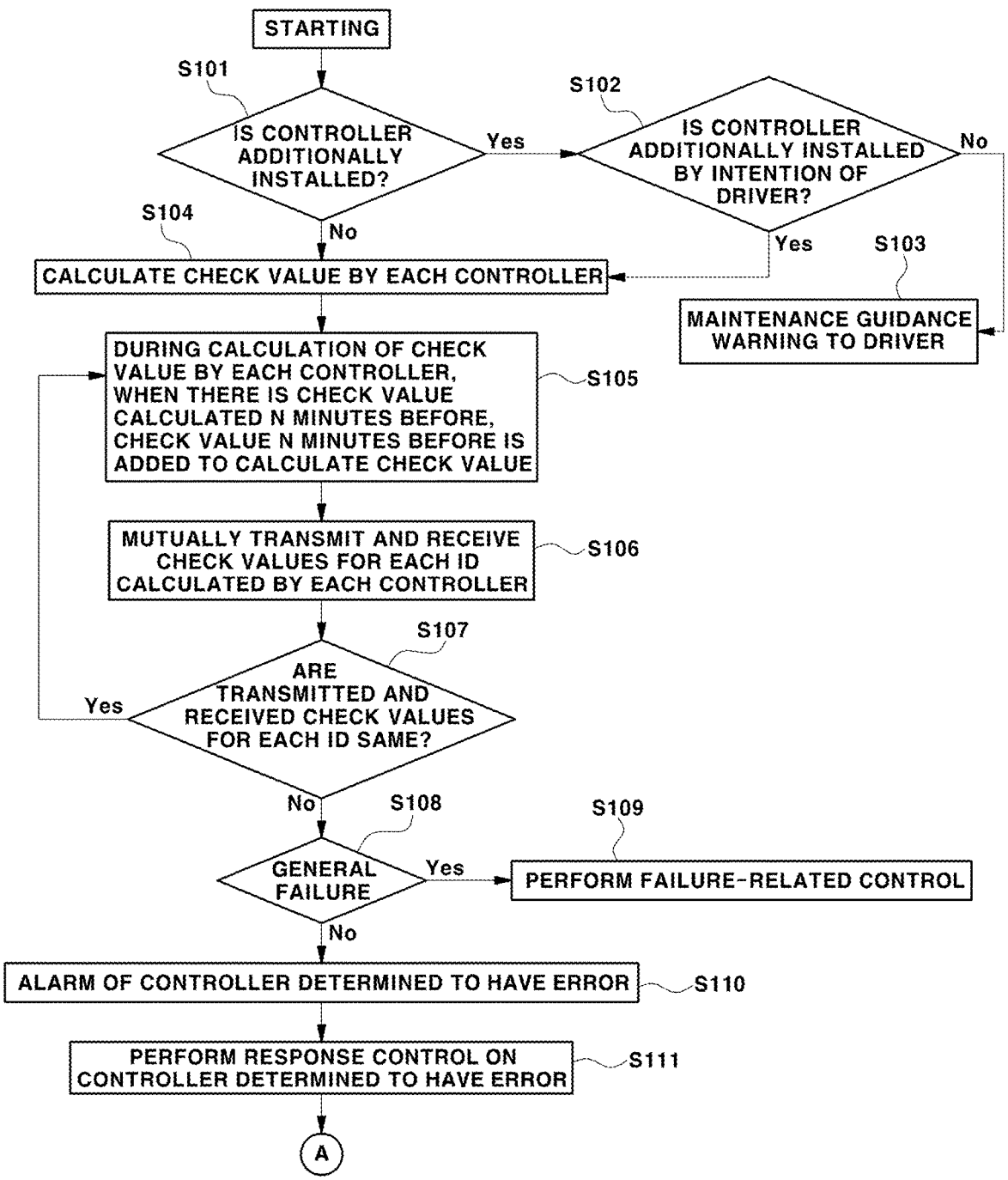
FIGS. 3 and 4 are flowcharts sequentially illustrating a control method for monitoring and responding to hacking into a vehicle according to the present disclosure.
Figure 4:
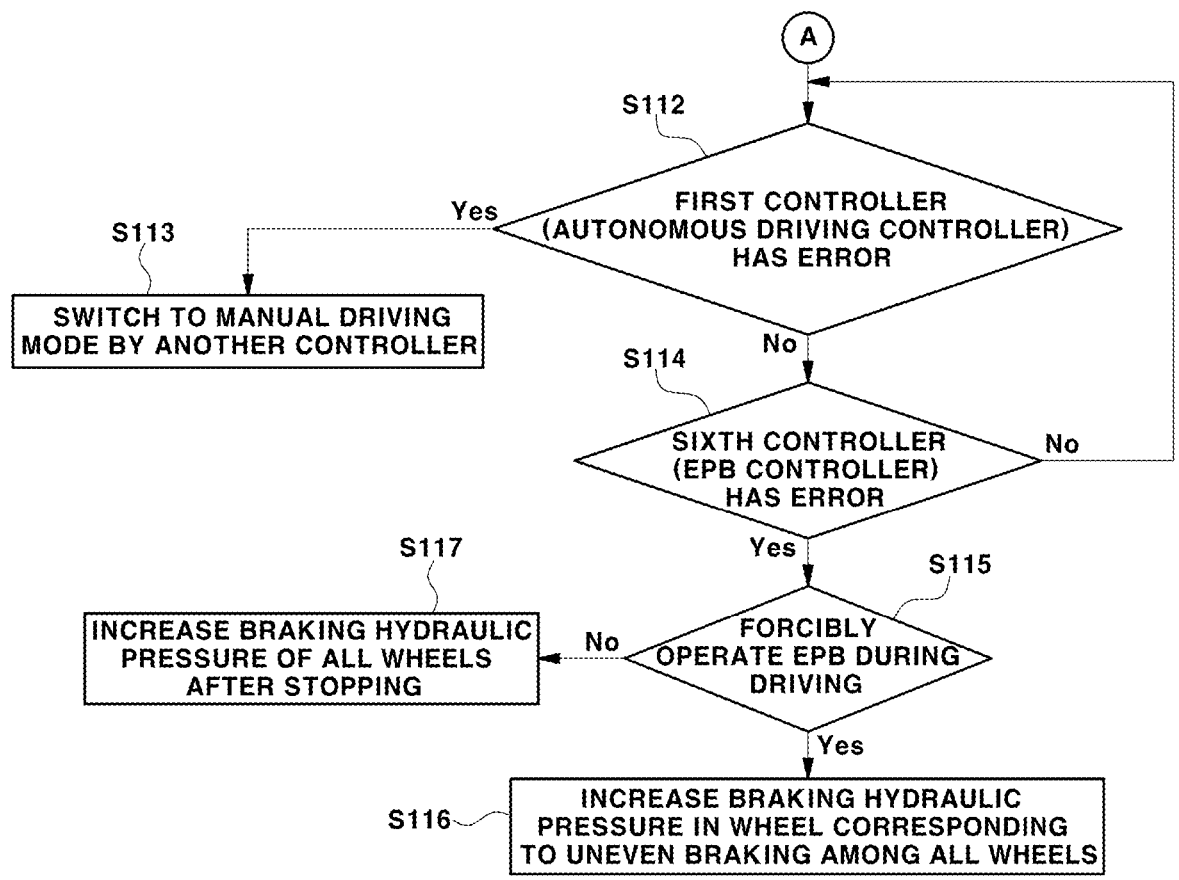

FIGS. 3 and 4 are flowcharts sequentially illustrating the control method for monitoring and responding to hacking into the vehicle according to the present disclosure.

First, after starting, it is determined whether a separate controller is additionally installed in the autonomous vehicle in addition to the existing controllers (S101).

For example, when the existing controllers mounted in the autonomous vehicle, that is, the first controller 11 to the nth controller 17, are initialized in response to starting, the controllers monitor each other through the CAN communication line 10, and upon determining that an additional CAN ID has been generated, it is determined that a separate controller is additionally installed in the first controller 11, which is the autonomous driving controller, in addition to the first controller 11 to the nth controller 17.

Upon determining that a separate controller is additionally mounted as a result of determination in step S101, it is verified whether the additionally mounted separate controller is added by intention of a driver (S102).

For example, according to a command of the first controller 11, which is the autonomous driving controller, the second controller 12, which is the cluster controller, outputs an alarm signal, etc. for verifying whether the separate controller is added by intention of the driver through a cluster, so that the driver can directly confirm this. When the separate controller is added by intention of the driver, the first controller 11 to the nth controller 17 may determine that the separate controller is normally added according to intention of the driver in response to feedback confirmation input through the cluster of the driver.

On the other hand, when the driver determines that the separate controller is not added by intention of the driver, a warning alarm signal for inducing the driver to obtain maintenance is output to the driver through the cluster (S103).

For example, when an alarm signal, etc. for verifying whether the separate controller is added by intention of the driver is output to the cluster, if the separate controller is not added by intention of the driver, the second controller 12, which is the cluster controller, outputs a warning alarm signal reporting that there is a problem in the vehicle through the cluster according to feedback input through the cluster of the driver, so that the driver may be induced to receive (obtain) maintenance at a repair shop.

Upon determining in step S101 that the separate controller is not additionally mounted, all the controllers mounted in the autonomous vehicle, that is, the first controller 11 to the nth controller 17, calculate a check value for determining whether hacking is performed (S104).

Alternatively, upon confirming that the separate controller is additionally mounted by intention of the driver in step S102, each of all the controllers including the added separate controller other than the first controller 11 to the nth controller 17 mounted in the autonomous vehicle calculates a check value for determining whether hacking is performed (S104).

Preferably, each of the controllers is assigned a unique ID or a designated ID. When each controller calculates a check value, the unique ID or designated ID is identifiably assigned to calculate a check value for each ID.

The check value, that is, the check value for each ID, is any value calculated using the same data value randomly determined at regular intervals in the first controller 11 to the nth controller 17 to determine whether each controller abnormally operates due to hacking, etc., and may be calculated and determined using various methods.

To this end, the check value may be calculated in a preset arithmetic manner using a previously calculated check value and a data value related to control randomly determined at regular intervals in each controller.

According to an embodiment of the present disclosure, the check value may be calculated by adding the previously calculated check value and the data value related to control randomly determined at regular intervals in each controller.

According to another embodiment of the present disclosure, the check value may be calculated by adding the previously calculated check value and the data value related to control randomly determined at regular intervals in each controller, and then processing the added value with a mod function.

To this end, each of the controllers 11 to 17 may be configured to calculate a check value for each ID using the following (Equation 1) at regular intervals.

$$\text{Check value for each } ID \text{ (Check\_value)}=[(byte1+byte2+byte3+byte4+byte5+byte6+byte7+byte8 \text{ (Check\_value\_}k1))] \bmod 256 \quad \text{(Equation 1)}$$

In Equation 1 above, byte1 to byte7 denote basic units in which any determined data value is allocated and stored, mod denotes a function for obtaining a remainder rather than a quotient when two numbers are subjected to division, Check_value_k1 denotes a previously calculated check value assigned to byte8, and 256 denotes any number larger than a value obtained by adding data values assigned to byte1 to byte7 and Check_value_k1.

For example, when all the controllers mounted in the vehicle, that is, the first controller 11 to the nth controller 17 receive, through the CAN communication line, each of any determined data values such as front left (FL) and front right (FR) wheel speeds and rear left (RL) and rear right (RR) wheel speeds detected by a wheel speed detection sensor, and a first hydraulic pressure, which is a master hydraulic pressure, a second hydraulic pressure, which is a first wheel cylinder hydraulic pressure, and a third hydraulic pressure, which is a second wheel cylinder hydraulic pressure, detected by a hydraulic pressure sensor, then allocates each of the received data values for each byte unit divided into byte1 to byte7, allocates a previously calculated check value to byte8, adds data values allocated to byte1 to byte 7, and then processes the added value with a mod function, a check value for each ID may be calculated.

FIG. 5 illustrate an example in which each controller calculates a check value for each ID according to an embodiment of the present disclosure.

Referring to a first table at the top of FIG. 5, when calculating the check value for each ID for the first time in each controller, in response to receiving each of any determined data values such as the FL and FR wheel speeds, the RL and RR wheel speeds, and the first hydraulic pressure, which is the master hydraulic pressure, the second hydraulic pressure, which is the first wheel cylinder hydraulic pressure, and the third hydraulic pressure, which is the second wheel cylinder hydraulic pressure, detected by a hydraulic pressure sensor, the FL wheel speed (for example, 55 kph) and the FR wheel speed (for example, 56 kph) are allocated to byte1 and byte2, respectively, the RL wheel speed (for example, 55 kph) and the RR wheel speed (for example, 56 kph) are allocated to byte3 and byte4, respectively, and the first hydraulic pressure (for example, 0), the second hydraulic pressure (for example, 20), and the third hydraulic pressure (for example, 10) are allocated to byte5 to byte7, respectively, and stored.

When the check value for each ID is first calculated, Check_value_k1 (previously calculated check value) does not exist, and thus a value assigned to byte8 is zero.

Next, a first check value for each ID is calculated using the above (Equation 1).

As illustrated in the first table at the top of FIG. 5, the first check value for each ID may be determined to be 252 by adding data values allocated to byte1 to byte8 (55+56+55+ 56+0+20+10+0), and is determined to be 252 even when the value is subjected to mod function processing in which the value is divided by 256, which is a random number.

In this instance, when a data value received through the CAN communication line in each controller changes, that is, when a randomly determined data value such as the FL and FR wheel speeds and RL and RR wheel speeds detected by the wheel speed detection sensor, and the first hydraulic pressure, which is the master hydraulic pressure, the second hydraulic pressure, which is the first wheel cylinder hydraulic pressure, and the third hydraulic pressure, which is the second wheel cylinder hydraulic pressure, detected by the hydraulic pressure sensor changes, the check value for each ID may be calculated again.

For example, as illustrated in a second table of FIG. 5, while the first to third hydraulic pressures are the same, the FL wheel speed (for example, 56 kph), the FR wheel speed (for example, 58 kph), the RL wheel speed (for example, 58 kph), the RR wheel speed (for example, 60 kph), etc. may change.

Accordingly, when a second check value for each ID is calculated by each controller, the FL wheel speed (for example, 56 kph) and the FR wheel speed (for example, 58 kph) are allocated to byte1 and byte2, respectively, the RL wheel speed (for example, 58 kph) and the RR wheel speed (for example, 60 kph) are allocated to byte3 and byte4, respectively, and the first hydraulic pressure (for example, 0), the second hydraulic pressure (for example, 20), and the third hydraulic pressure (for example, 10) are allocated to byte5 to byte7, respectively, and stored.

In this instance, when the check value for each ID is calculated for the second time, Check_value_k1 (previously calculated check value) becomes 252, which is the first calculated check value for each ID, and 252 is allocated to byte8.

Next, the second check value for each ID is calculated using the above (Equation 1).

That is, as illustrated in the second table of FIG. 5, the second check value for each ID may be determined to be 2 when the data values allocated to byte1 to byte8 are added (56+58+58+60+0+20+10+252), and then subjected to mod function processing.

After calculating the second check value for each ID as described above, when the FL wheel speed, the FR wheel speed, the RL wheel speed, the RR wheel speed, etc. change while the first to third hydraulic pressures are the same, the check value for each ID may be calculated again and differently determined to be 12 or 26 as illustrated in third and fourth tables of FIG. 5.

In this way, when calculating the check value for each ID, by further performing mod function processing on the sum of the data values randomly determined by each controller, security of the check value for each ID calculated by each controller may be strengthened, and accuracy for determining whether each controller is hacked may be improved.

According to another embodiment of the present disclosure, when each controller calculates a check value for each ID, if there is a check value calculated N minutes before, the check value calculated N minutes before is added and calculated (S105).

A check value for each ID according to another embodiment of the present disclosure may be calculated by further adding the check value calculated N minutes before and performing mod function processing on the added value other than adding a data value randomly determined by each controller and a previously calculated check value.

To this end, each of the controllers 11 to 17 may be configured to calculate a check value for each ID using the following (Equation 2) at regular intervals.

In other words, each of the controllers 11 to 17 may be configured to further add the check value calculated N minutes before (check_value_minute) as a weight as shown in (Equation 2) below when calculating the check value for each ID.

Check_value for each $ID$ (Check_value)=[(byte1+ byte2+byte3+byte4+byte5+byte6+byte7+byte8 (Check_value_$k$1)+check_value_minute] mod 256    (Equation 2)

In Equation 2 above, byte1 to byte7 denote basic units in which any determined data value is allocated and stored, mod denotes a function for obtaining a remainder rather than a quotient when two numbers are subjected to division, Check_value_k1 denotes a previously calculated check value assigned to byte8, 256 denotes any number larger than a value obtained by adding data values assigned to byte1 to byte7 and Check_value_k1, and check_value_minute denotes a check value calculated N minutes before.

For example, when all the controllers mounted in the vehicle, that is, the first controller 11 to the nth controller 17 receive, through the CAN communication line, each of any determined data values such as FL and FR wheel speeds and RL and
RR wheel speeds detected by a wheel speed detection sensor, and a first hydraulic pressure, which is a master hydraulic pressure, a second hydraulic pressure, which is a first wheel cylinder hydraulic pressure, and a third hydraulic pressure, which is a second wheel cylinder hydraulic pressure, detected by a hydraulic pressure sensor, then allocates each of the received data values for each byte unit divided into byte1 to byte 7, allocates a previously calculated check value (Check_value_k1) to byte8, adds data values allocated to byte1 to byte 7, then further adds a check value (check_value_minute) calculated N minutes before, and then processes the added value with a mod function, a check value for each ID may be calculated.

FIG. 6 illustrate an example in which each controller calculates a check value for each ID according to another embodiment of the present disclosure.

Referring to a first table at the top of FIG. 6, when calculating the check value for each ID for the first time in each controller, in response to receiving each of any determined data values such as the FL and FR wheel speeds, the RL and RR wheel speeds, and the first hydraulic pressure, which is the master hydraulic pressure, the second hydraulic pressure, which is the first wheel cylinder hydraulic pressure, and the third hydraulic pressure, which is the second wheel cylinder hydraulic pressure, detected by a hydraulic pressure sensor, the FL wheel speed (for example, 70 kph) and the FR wheel speed (for example, 56 kph) are allocated to byte1 and byte2, respectively, the RL wheel speed (for example, 55 kph) and the RR wheel speed (for example, 56 kph) are allocated to byte3 and byte4, respectively, and the first hydraulic pressure (for example, 0), the second hydraulic pressure (for example, 20), and the third hydraulic pressure (for example, 10) related to braking hydraulic pressure are allocated to byte5 to byte7, respectively, and stored.

When the check value for each ID is first calculated, Check_value_k1 (previously calculated check value) does not exist, and thus a value assigned to byte8 is zero.

In this instance, it is assumed that the check_value_minute is 50 as the check value calculated N minutes before, that is, the last calculated check value for each ID.

Next, a first check value for each ID is calculated using the above (Equation 2).

That is, as illustrated in the first table at the top of FIG. 6, the first check value for each ID may be determined to be 61 by adding the data values allocated to byte1 to byte8 (70+56+55+56+0+20+10+0), further adding a check value (check_value_minute) 50 calculated N minutes before, and then performing mod function processing using 256, which is a random number.

In this instance, when a data value received through the CAN communication line in each controller changes, that is, when a randomly determined data value such as the FL and FR wheel speeds and RL and RR wheel speeds detected by the wheel speed detection sensor, and the first hydraulic pressure, which is the master hydraulic pressure, the second hydraulic pressure, which is the first wheel cylinder hydraulic pressure, and the third hydraulic pressure, which is the second wheel cylinder hydraulic pressure, detected by the hydraulic pressure sensor changes, the check value for each ID may be calculated again.

For example, as illustrated in a second table of FIG. 6, while the first to third hydraulic pressures are the same, the FL wheel speed (for example, 71 kph), the FR wheel speed (for example, 58 kph), the RL wheel speed (for example, 58 kph), the RR wheel speed (for example, 60 kph), etc. may change.

Accordingly, when a second check value for each ID is calculated by each controller, the FL wheel speed (for example, 71 kph) and the FR wheel speed (for example, 58 kph) are allocated to byte1 and byte2, respectively, the RL wheel speed (for example, 58 kph) and the RR wheel speed (for example, 60 kph) are allocated to byte3 and byte4, respectively, and the first hydraulic pressure (for example, 0), the second hydraulic pressure (for example, 20), and the third hydraulic pressure (for example, 10) are allocated to byte5 to byte7, respectively, and stored.

In this instance, when the check value for each ID is calculated for the second time, Check_value_k1 (previously calculated check value) becomes 61, which is the first calculated check value for each ID, and 61 is allocated to byte8.

Next, the second check value for each ID is calculated using the above (Equation 2).

That is, as illustrated in the second table of FIG. 6, the second check value for each ID may be determined to be 132 by adding data values allocated to byte1 to byte8 (71+58+58+60+0+20+10+61), further adding the check value (check_value_minute) 50 calculated N minutes before thereto, and then performing mod function processing using 256, which is a random number.

After calculating the second check value for each ID as described above, when the FL wheel speed, the FR wheel speed, the RL wheel speed, the RR wheel speed, etc. change while the first to third hydraulic pressures are the same, the check value for each ID may be calculated again and differently determined to be 207 or 30 as illustrated in third and fourth tables of FIG. 6.

In this way, when calculating the check value for each ID, by further adding the check value for each ID (cheec_value_minute) calculated N minutes before, security of the check value for each ID calculated by each controller may be strengthened, and accuracy for determining whether each controller is hacked may be improved.

Meanwhile, even though a method of calculating the check value for each ID is described as calculating the check value for each ID using any determined data values such as the FL and FR wheel speeds, the RL and RR wheel speeds, and the first hydraulic pressure, which is the master hydraulic pressure, the second hydraulic pressure, which is the first wheel cylinder hydraulic pressure, and the third hydraulic pressure, which is the second wheel cylinder hydraulic pressure, detected by the hydraulic pressure sensor, it should be noted that the check value for each ID may be calculated using various data values related to the corresponding control of each controller.

Next, each controller mutually transmits and receives the check value for each ID calculated by each controller through the CAN communication line (S106).

Next, each controller compares a transmitted check value for each ID and a received check value for each ID with each other to determine error due to hacking (S107).

Subsequently, each of all the controllers mounted in the vehicle compares a check value for each ID transmitted to other controllers and a check value for each ID received from each of other controllers with each other to determine which of the other controllers indicates an error in the check value for each ID due to hacking, etc. In this instance, when each controller compares the check value for each ID transmitted to the other controllers with the check value for each ID received from the other controllers, it is determined that all other controllers are in a normal state without error.

For example, when check values for each ID transmitted from the first controller to the second to sixth controllers are ID 0x001: 50, ID 0x002: 63, ID 0x003: 115, ID 0x004: 15, ID 0x005: 21, and ID 0x006: 150 as shown in the table of FIG. 5, and check values for each ID received by the first controller from the second to sixth controllers are ID 0x001: 50, ID 0x002: 63, ID 0x003: 115, ID 0x004: 15, ID 0x005: 21, and ID 0x006: 150, the transmitted check values for each ID and the received check values for each ID are the same, and thus the first controller determines that the second to sixth controllers are in a normal state without error.

Similarly, the second to sixth controllers compare check values for each ID transmitted and received by the first transmitter to determine whether there is an error as described above in the same manner as cross-checking.

On the other hand, after each controller compares the check values for each ID transmitted to the other transmitters with the check values for each ID received from the other controllers, respectively, when the check values for each ID transmitted to the other transmitters are different from a check value for each ID received from any one of the other controllers, it is determined that the one of the other controllers is a controller in an error state due to hacking, etc.

Alternatively, in each controller, when a check value for each ID is not received from any one of the other controllers, it is determined that the one controller from which the check value for each ID is not received among the other controllers is a controller in an error state due to hacking, etc.

For example, when check values for each ID calculated and stored by the first controller and transmitted to the second to sixth controllers are ID 0x001: 50, ID 0x002: 63, ID 0x003: 115, ID 0x004: 15, ID 0x005: 21, and ID 0x006: 150 as shown in a table of FIG. 7, and check values for each ID received by the first controller from each of the second, third, fifth, and sixth controllers are ID 0x001: 50, ID 0x002: 63, ID 0x003: 115, ID 0x004: 15, ID 0x005: 21, and ID 0x006: 150, the transmitted check values for each ID and the received check values for each ID are the same, and thus the first controller determines that the second, third, fifth, and sixth controllers are in a normal state without error.

On the other hand, when check values for each ID calculated and stored by the first controller and transmitted to the second to sixth controllers are ID 0x001: 50, ID 0x002: 63, ID 0x001: 115, ID 0x004: 15, ID 0x005: 21, and ID 0x006: 150 as illustrated in a table of FIG. 8, and it is confirmed that check values for each ID received by the first controller from the fourth controller are not received such as ID 0x001: not received, ID 0x002: not received, ID 0x003: not received, ID 0x005: not received, and ID 0x006: not received, or ID 0x004: 17 among the check values for each ID received by the first controller from the fourth controller is not the same as ID 0x004: 15 among the transmitted check values for each ID, the first controller determines that the fourth controller is a controller in an error state due to hacking, etc.

Similarly, the second to sixth controllers compare check values for each ID calculated and transmitted by the second to sixth controllers with check values for each ID calculated and received by other controllers to determine that the fourth controller is a controller in an error state due to hacking, etc. as described above in the same manner as cross-checking.

In this instance, when only the first controller among all the controllers, that is, the first to sixth controllers determines that the fourth controller is a controller in an error state due to hacking, etc., it is impossible to clearly verify whether the fourth controller is genuinely a controller in which error occurs.

Accordingly, it is preferable that, when half or more of all the controllers that is, the first to sixth controllers determine that the fourth controller is a controller in an error state due to hacking, etc., the fourth controller is genuinely determined to be a controller in which error occurs.

In this way, in order to determine error due to hacking, etc., each controller compares the transmitted check value for each ID and the received check value for each ID with each other, and when the transmitted check value for each ID is the same as a check value for each ID received from each of the other controllers, each controller is determined to be in a normal state without error. Subsequently, steps S104 to S106 for determining a controller in an error state due to hacking, etc. are repeated.

On the other hand, as described above, when any one of all the controllers is determined to be a controller in an error state due to hacking, etc., an alarm step may be performed to visually warn a driver of presence of a controller determined to be in an error state through a display of a vehicle cluster (S110).

Subsequently, as described above, when any one of all the controllers is determined to be a controller in an error state due to hacking, etc., it is possible to perform response control for vehicle stabilization for the controller determined to have an error (S111) in addition to the alarm step for visually warning a driver of presence of a controller determined to be in an error state through a display of a vehicle cluster.

The response control for the controller determined to have an error refers to response control for safe driving of the vehicle.

To this end, a response control step for vehicle stabilization may include a control step in which another controller other than the controller in the error state due to hacking performs a function for the controller in the error state in place of the controller in addition to a control operation for minimizing an operation of the controller in the error state due to hacking.

That is, control of the vehicle may be erroneous due to the hacked controller, which may greatly decrease stability of the vehicle or cause a vehicle accident. Therefore, a non-hacked controller performs a unique function of the hacked controller instead in addition to control that minimizes or limits the operation of the hacked controller.

As an example, when the first controller 11 corresponding to the autonomous driving controller 100 among the respective controllers is determined to be a controller in an error state due to hacking, instead of outputting a control signal for autonomous driving from the autonomous driving controller, another controller may perform a control operation for switching a driving mode to a manual driving mode.

More specifically, when the first controller 11 corresponding to the autonomous driving controller 100 is determined to be a controller in an error state due to hacking, etc. (S112), without outputting a control signal for autonomous driving from the autonomous driving controller 100 corresponding to the first controller 11, the nth controller 17 corresponding to the braking controller for an electronic braking system as one of the other controllers outputs a control signal for switching to manual driving to the cluster, so that a control operation may be performed to switch the driving mode to the manual driving mode (S113), and driving may be performed according to a manual driving operation by the driver.

As another example, when the sixth controller 16 corresponding to the EPB controller 105 is determined to be a controller in an error state due to hacking, etc. (S114), whether or not the EPB is forcibly operated during driving is verified by the autonomous driving controller 100, which is the upper controller (S115).

Upon confirming that the EPB is forcibly operated due to an error of the EPB controller 105 while driving as a result of verification in S115, a negligent accident of the vehicle may occur as a result of unexpected braking and turning in one direction due to the forcibly operated EPB, and thus a control operation may be performed to increase the braking hydraulic pressure in a wheel corresponding to uneven braking among all wheels in order to prevent uneven braking (S116).

In other words, in order to prevent turning or deviation of the vehicle due to uneven braking caused by the operation of the EPB of the vehicle while the vehicle is driving in a straight line, a control operation may be performed on a wheel corresponding to the uneven braking to increase the braking hydraulic pressure, so that the vehicle may be prevented from turning or deviating from a route.

In this instance, in order to prevent uneven braking, a control operation for increasing the braking hydraulic pressure in the wheel corresponding to the uneven braking among all wheels, that is, a control operation for increasing the braking hydraulic pressure in a wheel capable of preventing turning among all the wheels, may be performed by issuing a command from the autonomous driving controller 100 to the braking controller 106 for the electronic braking system.

On the other hand, upon confirming that the EPB is not forcibly operated even through the EPB controller 105 is in an error state, as a result of verification in S115 above, normal driving can be achieved until the vehicle is stopped. After stopping, the EPB may not operate due to an error in the EPB controller 105, and thus the autonomous driving controller 100 instructs the braking controller 106 to perform a control operation to increase the braking hydraulic pressure of each wheel to a level allowing braking to stop (S117).

Accordingly, when the EPB is not operated due to an error state of the EPB controller 105 after the vehicle is stopped, the autonomous driving controller 100 instructs the braking controller 106 to perform a control operation to increase the braking hydraulic pressure of each wheel to a level allowing braking to stop, so that parking braking may be easily performed when the vehicle is parked and stopped.

As such, when one or more of the respective controllers is determined to be in an error state due to hacking, etc., an alarm step of visually warning the driver that a controller determined to be in error state exists through the vehicle cluster display, etc. and response control for safe driving and stopping on the controller determined to have error are performed, so that the vehicle may be preemptively stabilized when error is determined for each controller.

Meanwhile, when any one controller among all the controllers is determined to be a controller in an error state due to hacking as described above as a result of the progress of step S107, a step of verifying whether the controller determined to be in the error state is in a general failure state rather than a hacked state may be further performed (S108).

In other words, in the step of verifying whether the controller determined to be in the error state is in the general failure state rather than the hacked state, when the controller determined to be in the error state outputs a general fault signal such as not being able to increase the basic numeric count, etc., it is possible to determine that the controller determined to be in the error state is in the general failure state rather than the hacked state.

Accordingly, when it is determined that the controller determined to be in the error state is in the general failure state rather than the hacked state, a failure-related control operation such as a failure-related alarm of the corresponding controller may be performed through a display of the cluster of the vehicle (S109).

Accordingly, the driver may recognize that the controller determined to be in the error state through the alarm is in a general failure state rather than a hacked state, and may induce the driver to obtain maintenance for the controller in the failure state.

Through the means for solving the above problems, the present disclosure provides the following effects.

First, each controller mounted in the vehicle calculates a check value for each ID using a randomly determined data value, mod function processing, etc., and the controllers mutually transmit and receive calculated check values for each ID to cross-check whether the values are the same, so that whether each controller is hacked may be accurately determined.

Second, when one or more of the respective controllers is determined to be in an error state due to hacking, etc., an alarm step of visually warning a driver of presence of the controller determined to be in the error state through display of the vehicle cluster and response control for safe driving and stopping on the controller determined to be in the error state are performed, so that the vehicle may be preemptively stabilized in response to detection of error for each controller.

Even though the present disclosure has been described in detail as one embodiment above, the scope of the present disclosure is not limited to the embodiments described above, and various modifications and improvements by those skilled in the art using the basic concept of the present disclosure as defined in the claims below will be included in the scope of the present disclosure.

What is claimed is:

1. A control method for monitoring and responding to hacking into a vehicle, the method comprising:
    calculating, by each of a plurality of controllers, a check value to determine whether hacking is performed, wherein the plurality of the controllers are mounted in the vehicle and connected so that data is allowed to be transmitted and received;
    mutually transmitting and receiving, by each of the plurality of the controllers, a calculated check value; and
    comparing, by each of the plurality of the controllers, a transmitted check value with a received check value to determine whether any one or more controllers among the plurality of the controllers is in an error state due to hacking according to whether the transmitted check value and the received check value are the same, and
    performing, by at least one of the plurality of the controllers, a response control step of vehicle stabilization for a controller determined to be in an error state in response to any one of the plurality of the controllers being determined to be the controller determined to be in the error state due to hacking.

2. The control method of claim 1, wherein, in response to each of the plurality of the controllers calculating the check value, the control method further comprises, calculating, by each of the plurality of the controllers, a check value for each ID by assigning a designated ID to each of the plurality of the controllers.

3. The control method of claim 1, wherein the check value is calculated, by each of the plurality of the controllers, using a preset calculation method using a randomly determined data value related to control and a previously calculated check value at regular intervals.

4. The control method of claim 3, wherein the check value is calculated, by each of the plurality of the controllers, by adding the randomly determined data value related to the control to the previously calculated check value at the regular intervals.

5. The control method of claim 3, wherein the check value is calculated, by each of the plurality of the controllers, by adding the randomly determined data value related to the control to the previously calculated check value at the regular intervals and then performing, by each of the plurality of the controllers, mod function processing.

6. The control method of claim 3, wherein, there is a first check value calculated N minutes before, and the check value is calculated by further adding the first check value to a value obtained by adding the randomly determined data value related to the control to the previously calculated check value at the regular intervals and then performing, by each of the plurality of the controllers, mod function processing on the added value.

7. The control method of claim 1, wherein, the transmitted check value is a check value transmitted to other controllers, the received check value is a check value received from each of the other controllers, the transmitted check value is compared with the received check value, and the transmitted and received check values are the same, the control method includes determining, by each of the plurality of the controllers, that all the other controllers are in a normal state without error.

8. The control method of claim 1, wherein, the transmitted check value is a check value transmitted to other controllers, the received check value is a check value received from each of the other controllers, the transmitted check value is compared with the received check value, and the transmitted check value is not the same as the received check value received from any one of the other controllers, the control method includes determining, by each of the plurality of the controllers, that the one of the other controllers is a controller in an error state due to hacking.

9. The control method of claim 8, wherein, in response to a check value not being received from any one of the other controllers, the control method includes determining, each of the plurality of the controllers, that the one of the other controllers from which the check value is not received is a controller in an error state due to hacking.

10. The control method of claim 1, further comprising performing, by at least one of the plurality of the controllers, an alarm step including warning that a controller determined to be in an error state is present through a display of a cluster in response to any one of the plurality of the controllers being determined to be a controller in an error state due to hacking.

11. The control method of claim 1, wherein the response control step of vehicle stabilization includes a step of performing, by the at least one of the plurality of the controllers, a control operation of minimizing an operation of the controller in the error state due to hacking and performing, by the at least one of the plurality of the controllers, a function of the controller in the error state in place of the controller by another controller not in an error state due to hacking.

12. The control method of claim 11, wherein, the response control step of vehicle stabilization includes, upon determining, by the at least one of the plurality of the controllers, that an autonomous driving controller among the plurality of the controllers is the controller in the error state due to hacking, the autonomous driving controller does not output a control signal for autonomous driving, and performing, by another controller, a control operation to switch a driving mode to a manual driving mode.

13. The control method of claim 11, wherein the response control step of vehicle stabilization includes, upon determining, by the at least one of the plurality of the controllers, that an electronic parking brake (EPB) controller among the plurality of the controllers is the controller in the error state due to hacking, verifying, by an autonomous driving controller, whether an EPB is forcibly operated during driving, and then upon confirming that the EPB is forcibly operated, performing, by the at least one of the plurality of the controllers, a control operation including increasing braking hydraulic pressure in a wheel corresponding to uneven braking to prevent uneven braking.

14. The control method of claim 11, wherein, the response control step of vehicle stabilization includes, in response to an EPB controller among the plurality of the controllers being determined to be the controller in the error state due to hacking, and an EPB is not operated after the vehicle is stopped, performing, by an autonomous driving controller, a control operation to increase braking hydraulic pressure of each wheel to a level allowing braking to stop.

15. The control method of claim 1, wherein, in response to any one of the plurality of the controllers is determined to be a controller in an error state, and the controller determined to be in the error state outputs a general failure signal, not a hacking signal, the control method further comprises determining, by at least one of the plurality of the controllers, that the controller determined to be in the error state is in a general failure state, not a hacked state.

16. A control method for monitoring and responding to hacking into a vehicle, the method comprising:
  calculating, by each of a plurality of controllers, a check value to determine whether hacking is performed, wherein the plurality of the controllers are mounted in the vehicle and connected so that data is allowed to be transmitted and received;
  mutually transmitting and receiving, by each of the plurality of the controllers, a calculated check value;
  comparing, by each of the plurality of the controllers, a transmitted check value with a received check value to determine whether any one or more controllers among the plurality of the controllers is in an error state due to hacking according to whether the transmitted check value and the received check value are the same; and
  determining, by at least one of the plurality of the controllers, whether a separate controller is additionally installed in the vehicle before the check value is calculated.

17. The control method of claim 16, further comprising verifying, by at least one of the plurality of the controllers, whether the additionally installed separate controller is added by intention of a driver upon determining that the separate controller is determined to be additionally installed.

18. The control method of claim 17, wherein, upon confirming that the separate controller is additionally installed by intention of the driver, the control method further comprises calculating, by the separate controller and the plurality of the controllers installed in the vehicle, a check value to determine whether hacking is performed.

19. The control method of claim 17, wherein, in response to the separate controller not being additionally installed by intention of the driver, the control method includes outputting, by a cluster controller among the plurality of the controllers, an alarm signal to obtain maintenance to the driver.

* * * * *